July 23, 1940.  F. MILLIKEN  2,208,870
LUBRICATED VALVE
Filed Dec. 6, 1937    2 Sheets-Sheet 1
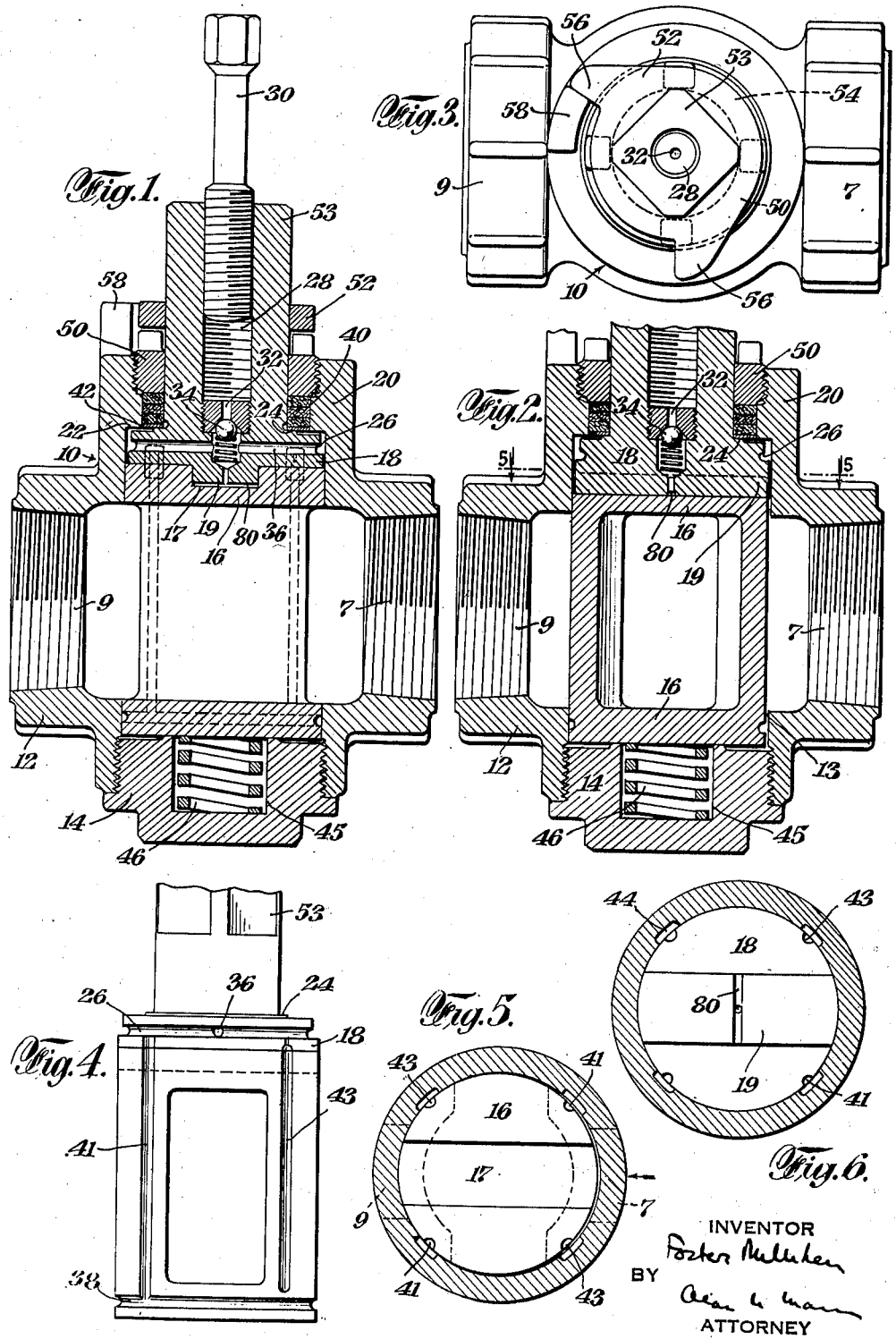
INVENTOR
Foster Milliken
BY
ATTORNEY July 23, 1940.  F. MILLIKEN  2,208,870
LUBRICATED VALVE
Filed Dec. 6, 1937    2 Sheets-Sheet 2
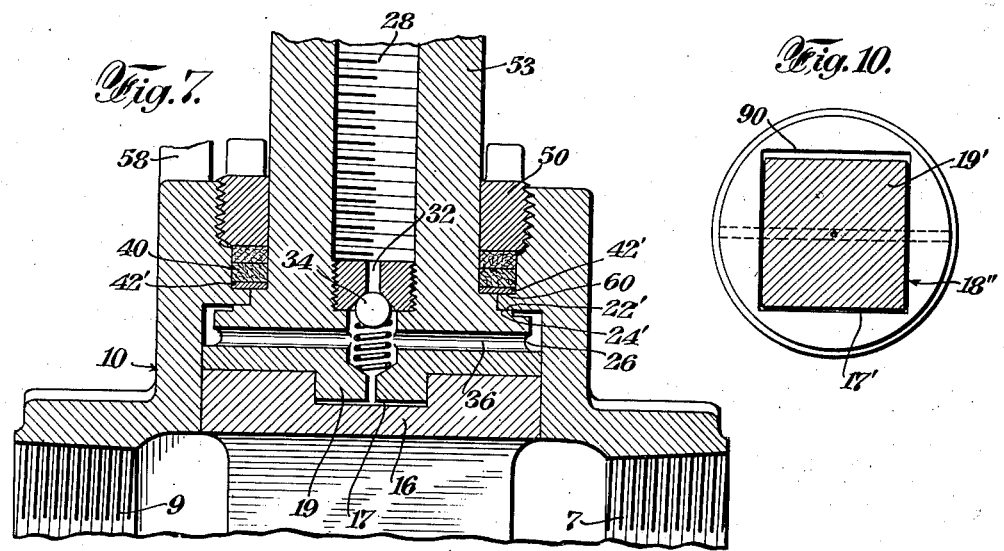
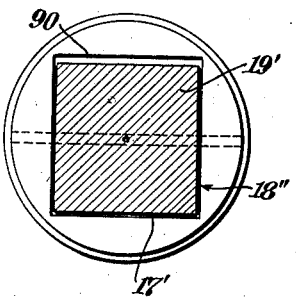
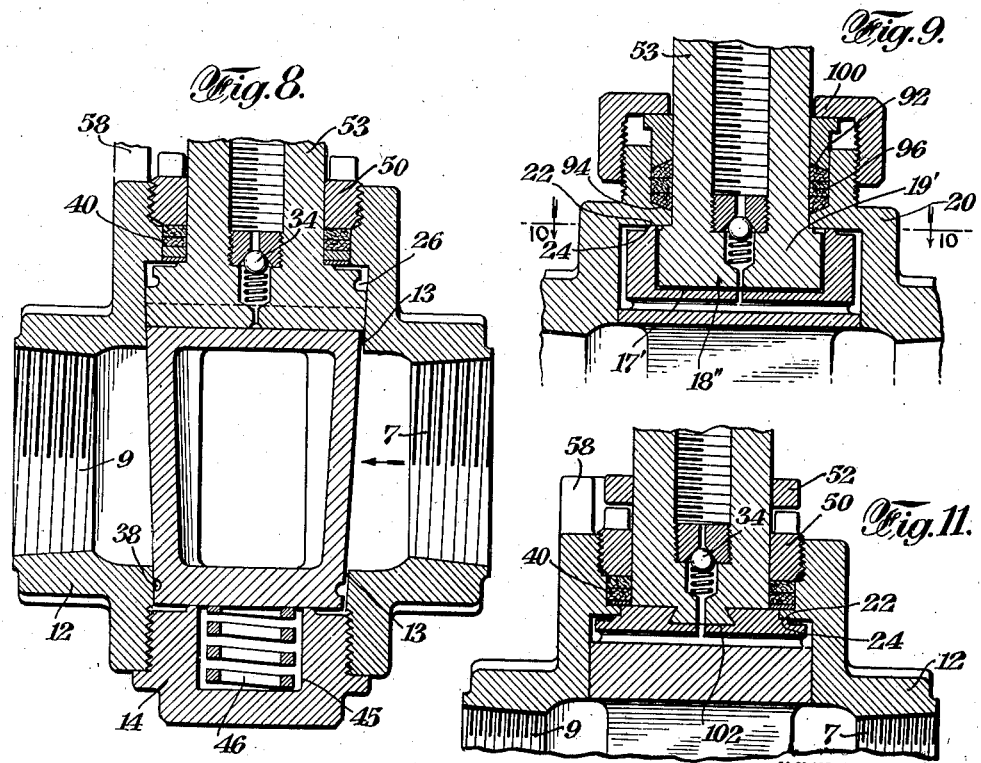
INVENTOR
Foster Milliken
BY
ATTORNEY Patented July 23, 1940

2,208,870

UNITED STATES PATENT OFFICE 2,208,870

LUBRICATED VALVE

Foster Milliken, Lawrence, N. Y., assignor to Milliken Valve Corporation, a corporation of New York Application December 6, 1937, Serial No. 178,271

1 Claim. (Cl. 251—93)

A constant problem in the field of lubricated valves is the design and construction of a valve which will maintain a perfect seal under all conditions. A particular problem arises when a lubricated valve is in closed position under line pressure. In such case the line pressure tends to thrust the plug against the further wall of the valve body and to seat the plug and body at the outlet port in metal to metal contact in the direction of the line pressure. In a packless lubricated valve, such for example as is disclosed in my co-pending application Serial No. 66,375, Patent 2,171,590, Sept. 5, 1939, this movement and seating of the plug is utilized to provide an effective seal against leakage both in the port and in the head. The metal to metal contact of the plug seated under line pressure against the body at the outlet port prevents port leaks. Head leaks are prevented by constructing the valve so that movement of the plug in the direction of the line pressure permits that pressure to act underneath the plug and thereby to hold the shoulder of the plug in metal to metal contact with the shoulder of the body. Obviously the higher the pressure the tighter the seal in each case. In packed lubricated valves, however, this construction does not operate to prevent leakage because in such valves the plug is held centrally in the body by the packing. Movement of the plug in the direction of the line pressure therefore cannot be utilized to prevent port leakage. On the contrary, where the plug is held centrally by the packing, the action of the line pressure on the plug tends to create leakage in the port.

I have discovered that the principle of utilizing line pressure to prevent port leaks can be applied to packed lubricated valves by providing such valves with a valve plug consisting of two separate parts which I call the upper plug and the lower plug. The joint which holds the upper and lower plug is so constructed that it permits movement of the lower plug when the valve is in closed position in response to line pressure independently of the upper plug which is held centrally by the packing. In this manner I am able to utilize line pressure to seal the outlet port when the valve is in closed position by having the lower valve seated against the body under line pressure and at the same time to utilize the displacement of the lower plug in the body which follows the sliding movement of the lower plug to permit line pressure to act underneath the plug to seal the head of the plug by metal to metal contact of the upper plug shoulder and the body shoulder.

In my structure it is not necessary to have metal to metal contact to act as a seal in the head of the valve as the packing in the valve acts to prevent leakage. However, a double seal is preferable and is readily obtained by providing both metal to metal contact and packing in the head of the valve. Where there is a double seal in the head of the valve it is a very important advantage of my invention that it permits repacking of the valve while the line is still under pressure.

In addition, in some of the forms embodying my invention it is possible to remove the lower plug from the valve for cleaning purposes without the necessity of taking the valve apart at the head.

Ordinarily, circumferential lubricant grooves are cut around the top and bottom portions of a plug. In my invention I prefer to have the top circumferential lubricant grooves cut in the upper plug. When the top grooves are cut in the upper plug, lubricant pressure acting in the grooves against the body wall cannot hold the lower plug away from the body wall at the outlet side. Accordingly, I find it is possible to obtain a particularly tight metal to metal seal in this construction. Lubricant pressure acting in the bottom circumferential lubricant grooves cut in the lower plug is not sufficiently great to hold the lower plug away from the body wall, for the lubricant pressure in the bottom circumferential grooves is never very great and generally runs to about 30% of the pressure exerted in the top circumferential lubricant grooves. This great difference in pressure is well known and I utilize the differential in my preferred construction.

A number of forms of sectional plugs embodying the principle of my invention are shown in the drawings:

Fig. 1 is a vertical section of a valve in open position showing upper and lower plugs having a tongue and groove joint;

Fig. 2 shows the valve of Fig. 1 in closed position;

Fig. 3 is a top view of the valve of Fig. 1;

Fig. 4 is a sectional view of the plug of the valve shown in Fig. 1;

Fig. 5 is a section taken substantially on the line 5—5 of Fig. 2 looking down;

Fig. 6 is a section taken substantially on the line 5—5 of Fig. 2, looking up;

Fig. 7 is a partial section showing the detail of the valve similar to Fig. 1;

Fig. 8 is a vertical section of a tapered valve in a closed position;

Fig. 9 is a partial section of a modified form of the sectional plug showing a metal to metal contact between the head of the lower plug and the body;

Fig. 10 is a cross section taken substantially on the line 10—10 of Fig. 9; and

Fig. 11 is a partial section of a valve showing a dove-tail joint between the upper and lower plug.

The reference character 10 designates a hollow body provided with two screw ends 12. Body 10 has a bottom opening closed by a screw cover 14. The opening leads to the interior of the body in which is located the lower valve plug 16 provided with a groove 17 running at right angles to the axis of the port through the plug. The upper valve plug 18 is provided with a tongue 19 adapted to be fitted into groove 17. In the form of valve shown in Figs. 1, 2 and 8 the head of the valve is sealed by packing. In such case the shoulder 24 of the upper plug 18 is seated against a portion of a metal washer 42. Immediately adjacent the contact of these two surfaces the top portion of the upper plug 18 is cut away to form a recess or lubricant duct 26.

The upper plug 18 has a central receptacle 28 for the introduction of lubricant. The receptacle 28 is provided with a pressure screw 30. Lubricant from the receptacle 28 passes through the passage 32 past the check valve 34 into the horizontal passage 36 of plug 18 which passage extends to the lubricant duct or channel 26. A lubricant duct extends downward from the recess chamber containing the check valve to the underside of tongue 19 and connects with horizontal duct 80 (see Figs. 2 and 6) or bottom portion of said tongue.

Check valve 34 prevents back pressure from forcing lubricant from the grooves back into the lubricant receptacle. The pressure screw 30 shown in the drawings is of common type, but I actually prefer to use a pressure screw embodying the invention of my co-pending application Serial No. 66,375. My particular form of pressure screw forms no part of my present invention, but I may state that it is provided with means to release excess pressure at a predetermined point directly from the lubricant receptacle. In a valve provided with such means it is not possible to burst the valve by building up undue lubricant pressure in the valve. Use of means automatically to release excess pressure is particularly necessary in my present valve owing to the absolute seal at the head of the valve.

Between the ring shaped portion 20 and the upper plug 18 there is a space into which packing 40 is inserted and this packing is supported by a metal washer 42. The metal washer 42 bears on a shoulder 24 of the upper plug 18 on its inner side. The packing is compressed by means of a stuffing box gland 50 provided with a screw thread. Above the stuffing box gland 50 is a movable collar 52 secured to the stem 53 of the upper plug 18 by a set screw 54. Lugs 56 on the collar (see Fig. 3) are adapted to engage with stop 58 on the body to limit the rotation of the plug to a quarter turn.

In the example shown the lower plug 16 is formed with a circumferential lubricant duct 26 at the top and 38 at the bottom (see Fig. 4). Two vertical lubricant ducts 41 arranged in diametrically opposite positions extend from the lubricant duct 38 up to the lubricant duct 26. Two shorter vertical lubricant ducts 43 are arranged diametrically opposite each other in the plug, but do not quite connect with the top and bottom lubricant ducts 26 and 38. Supplementing the lubricant ducts 43, recesses 44 (see Fig. 6) are formed in the body and in that event they are so positioned that when the valve is either in extreme open or closed position the ducts 43 are connected through the recesses to the lubricant ducts 26. If desired similar supplementary recesses in the body may be provided at the bottom to connect the lubricant ducts 43 with the lubricant duct 38. The operation and function of these grooves and recesses does not form part of the present invention and is more fully explained in Milliken Patent No. 1,915,068.

The bottom cover 14 screws into the body 10 to form a tight fit therewith and preferably leaves a slight clearance between its upper face and the lower face of the lower plug 16. This bottom cover is preferably formed with a recess 45 and supports a spring 46 which presses the plug upwardly so that seating shoulder 24 will be kept against the metal washer 42. In Figs. 7, 9 and 11, however, the seating shoulder 24 is pressed against the seating surface 22 to form a metal to metal seal in the head of the valve.

In Fig. 2 the valve is in closed position under line pressure. The arrow designates the direction of line pressure at the inlet port 7. The lower plug 16 is seated under line pressure against the further wall of the body 10 at the outlet port 9. At the inlet port the displacement of the lower plug provides a space 13 adjacent the inlet port. In the drawings the space 13 is exaggerated. When the lower plug is in this position under line pressure the line pressure exerts pressure either directly under the lower plug or against the lubricant in one of the vertical lubricant channels and this pressure is transmitted to the lubricant in the bottom cover tending to assist spring 46 in holding shoulder 24 against seat 22' thereby preventing head leaks by virtue of the metal to metal contact. The metal to metal seal in the head is shown in Figs. 7, 9 and 11. In Figs. 1, 2 and 8 the contact is against the metal washer 42. Where the valve has a complete metal seal in the head the higher the line pressure the tighter the head becomes. At the same time the upper plug 18 is held centrally by the packing 40; but owing to the joint between the upper and lower plugs (in this case a tongue and groove joint) the upper plug can be held centrally while the lower plug moves over under line pressure when the valve is in closed position.

Fig. 7 shows an alternative form of construction in which the metal washer 42' below the packing rests directly on a shoulder 24' of the upper plug and on a shoulder 60 of the body. This construction prevents the upper and lower plugs from being forced downward by virtue of undue pressure from the packing. In addition, this construction provides a double seal against head leakage. The metal to metal contact of the plug shoulder 24' with the seating surface 22' forms the first seal as explained in my Patent Reissue No. 17,337; and the packing forms the second seal.

In the form of device shown in Fig. 8 a tapered plug is shown in closed position corresponding to the position of the cylindrical plug in Fig. 2.

Another form of joint between the upper and lower plugs is shown in Figs. 9 and 10. In this form the upper plug 18" is provided with a projecting member 19' adapted to engage a corresponding recess 17' in the lower plug. Two opposite sides of the recess engage two sides of the projecting member and the clearance between them is inconsequential. However, a substantial clearance is provided between the other two sides of the projecting member and the other two sides of the recess member to provide a relatively larger space between the projecting member and the walls of the recess to permit the lower plug 16' to move horizontally relative to upper plug 18''. In Fig. 10 the relatively larger space is shown at 90.

With regard to Fig. 8, which shows a tapered plug, it is not necessary in my invention to force the plug down on its seat to have a tight joint.

Fig. 9 shows a recess in the inner wall of the cup-shaped portion 28 on the body shoulder to provide a space for radial packing. This recess is formed with a bevelled top surface 92 and a bevelled bottom surface 94. Between the stem of the upper plug 18 and the recess packing 96 is inserted. When the stuffing box gland is forced down by means of a gland cap 100, the threads of which engage with threads on the body, it provides a high resultant or component of sidewise pressure.

A dove-tail joint 102 between the upper and lower plugs is shown in Fig. 11 which also shows a double seal in the head of the valve comprising metal to metal contact of the shoulder of the upper plug and the body shoulder and packing in the recess. In this construction the upper plug is prevented from becoming displaced from the associated parts under the influence of pressure urging the stem upwardly.

While I have shown and described my invention for use particularly in connection with packed lubricated valves, I find that my invention can be utilized with equal effect in packless lubricated valves, such, for example, as are shown in my co-pending application Serial No. 66,375, Patent No. 2,171,590, Sept. 5, 1939.

In valves having a split plug made in accordance with my invention I find that the valve can be opened and closed under heavy hydraulic pressure with very much less force than is required in valves of the ordinary type.

What I claim is:

In a lubricated valve having a body with inlet and outlet ports and a rotatable plug fitted into a seat within the body and having a port adapted to be moved into and out of registration with the ports of the body, a plug comprising a plurality of separable parts, said parts consisting of a stem portion and a base portion, the stem and base portions being adapted to co-act so that the base of the plug can be moved relative to the stem and held under line pressure against the body wall at the outlet side of the valve in metal to metal contact to seal the port, the stem portion of the plug remaining stationary in the valve, said plug having circumferential lubricant grooves in the upper part of the plug cut only in the stem portion of the plug.

FOSTER MILLIKEN.